United States Patent [19]
Hansen

[11] Patent Number: 6,163,430
[45] Date of Patent: Dec. 19, 2000

[54] DISC DRIVE POSITIONING SYSTEM WITH VARIABLE DECELERATION CURVE

[75] Inventor: Fred R. Hansen, Newark, Calif.

[73] Assignee: Seagate Technology LLC, Scotts Valley, Calif.

[21] Appl. No.: 08/789,710

[22] Filed: Jan. 27, 1997

Related U.S. Application Data

[60] Provisional application No. 60/022,170, Jul. 18, 1996.

[51] Int. Cl.[7] .................................................. G11B 5/596
[52] U.S. Cl. ........................................ 360/78.06; 318/561
[58] Field of Search ............................. 360/78.06, 78.07, 360/78.12, 78.04; 318/561

[56] References Cited

U.S. PATENT DOCUMENTS

| | | | |
|---|---|---|---|
| 4,535,372 | 8/1985 | Yeakley | 360/77.05 |
| 4,591,933 | 5/1986 | Quackenbush | 360/78.06 X |
| 4,638,230 | 1/1987 | Lee | 318/632 |
| 4,835,633 | 5/1989 | Edel et al. | 360/78.12 |
| 4,982,298 | 1/1991 | Volz et al. | 360/78.06 |
| 5,119,250 | 6/1992 | Green et al. | 360/78.06 |
| 5,182,684 | 1/1993 | Thomas et al. | 360/78.06 X |
| 5,305,160 | 4/1994 | Funches et al. | 360/78.06 X |
| 5,684,653 | 11/1997 | Knowles | 360/78.06 X |

*Primary Examiner*—Andrew L. Sniezek
*Attorney, Agent, or Firm*—Westman, champlin & Kelly, P.A.

[57] ABSTRACT

An actuator in a disc drive is controlled to position a transducer over a target track on a disc surface. Movement of the actuator is initiated so the transducer begins moving toward the target track. The actuator is decelerated, as the transducer approaches the target track, according to a deceleration curve which is varied based on drive characteristics.

20 Claims, 3 Drawing Sheets

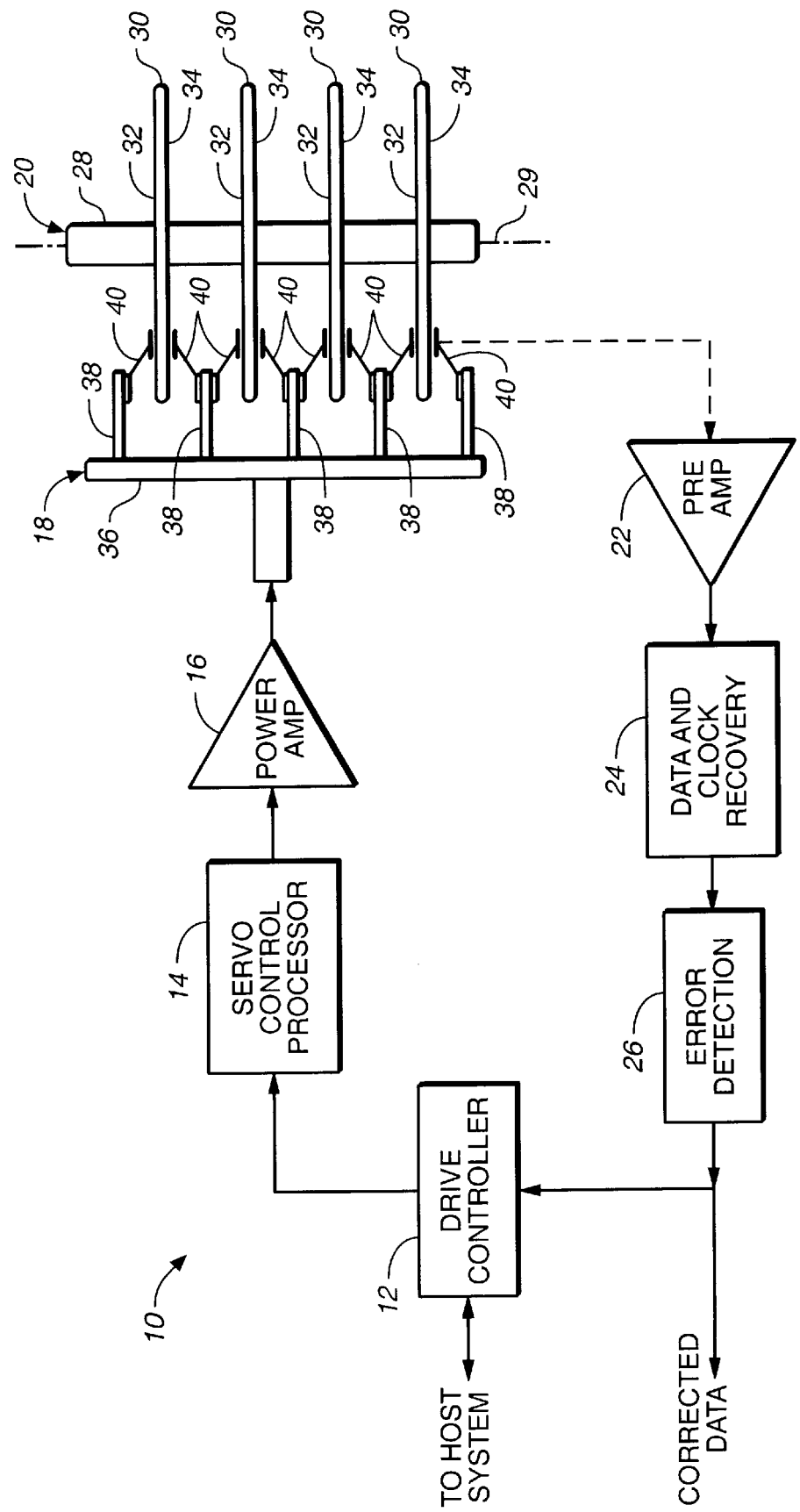
FIG._1

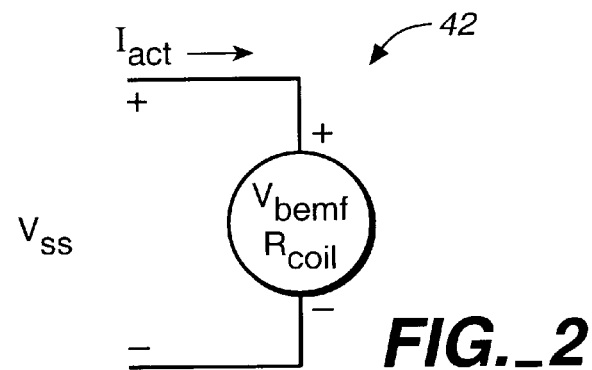
FIG._2
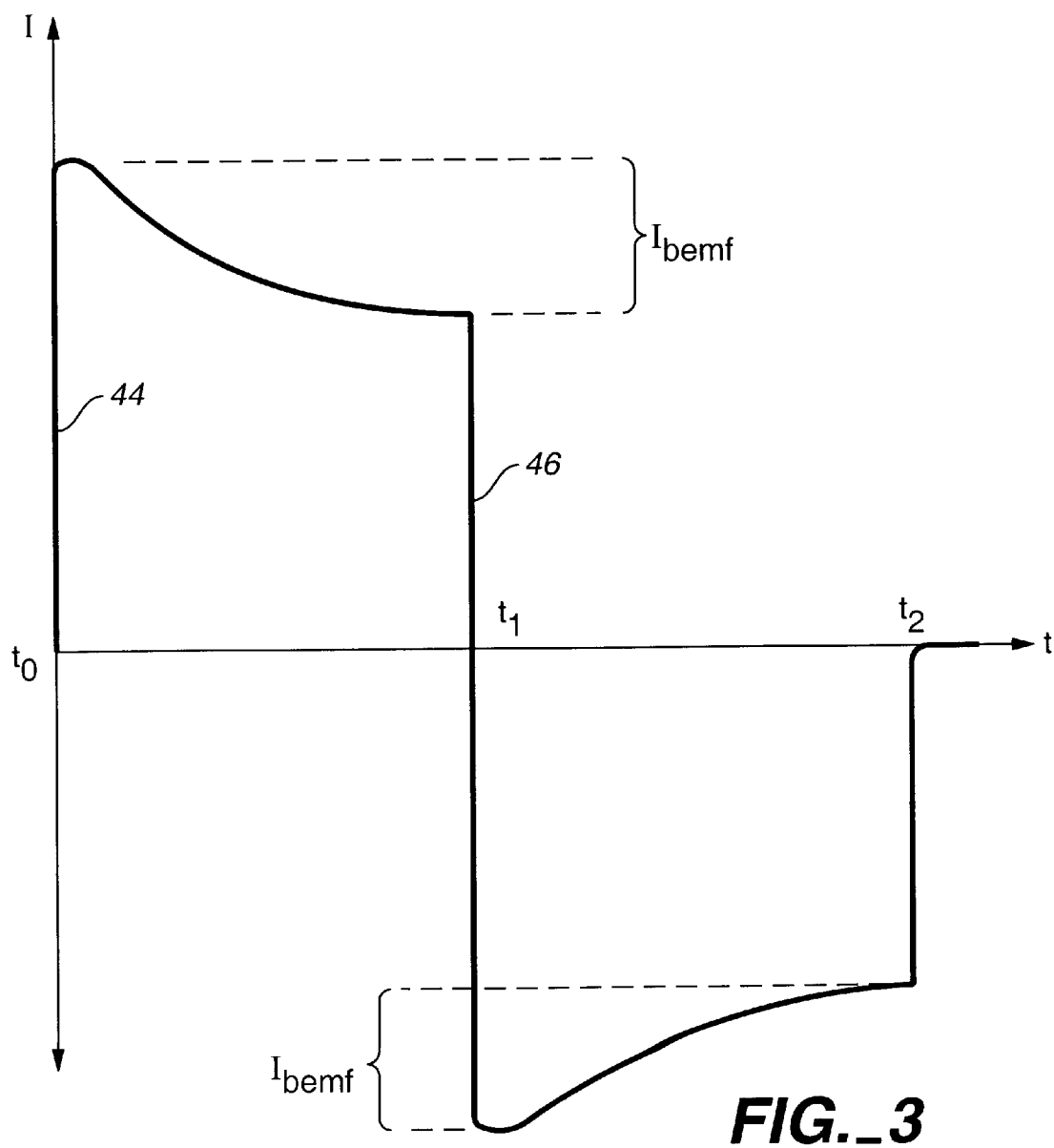
FIG._3

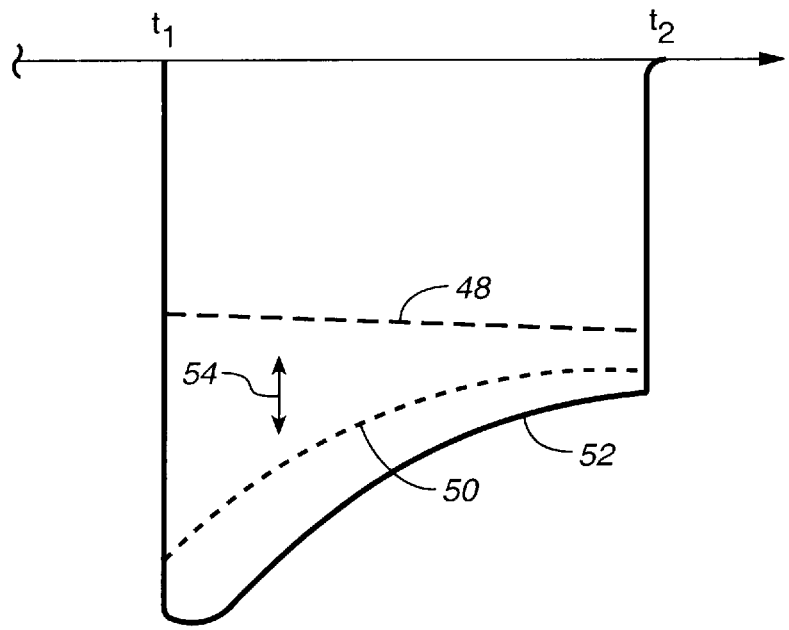
FIG._4
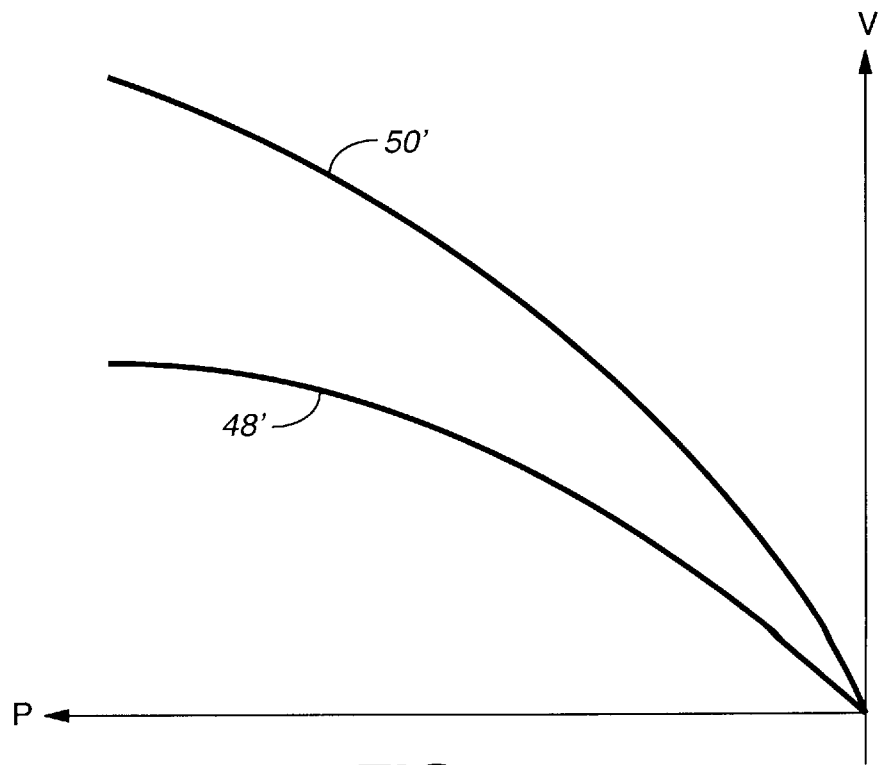
FIG._5

DISC DRIVE POSITIONING SYSTEM WITH VARIABLE DECELERATION CURVE

REFERENCE TO RELATED APPLICATION

The present application is based on a provisional application Ser. No. 60/022,170 filed on Jul. 18, 1996.

BACKGROUND OF THE INVENTION

The present invention deals with disc drives. More specifically, the present invention deals with controlling an electromechanical actuator for positioning a transducer over a disc in a disc drive.

A typical disc drive includes one or more magnetic discs mounted for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls a disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on the magnetic disc, and consequently represented in the read signal provided by the data head.

In performing a track seek operation, the disc drive controller causes a voltage to be applied across the electromechanical actuator in a first polarity causing the electromechanical actuator to accelerate in positioning the transducer over the disc. As the data head approaches the desired track (or target track) on the disc, the disc drive controller causes voltage from the power supply to be applied across the electromechanical actuator in an opposite polarity in order to decelerate the electromechanical actuator, and eventually stop the electromechanical actuator over the desired track. Characteristics of each disc drive can vary from disc drive-to-disc drive, and during the life of, or even during a single operational period, of a disc drive. For example, the actual output voltage provided by the voltage supplies in each disc drive can vary within certain tolerances, as can the magnet strength of the magnets in each electromechanical actuator. Further, as the disc drive operates, it typically heats up. Temperature variations in the disc drive can also affect optimum actuator control. Finally, as a drive ages, it can undergo changes caused by signal values drifting and components fatiguing.

In order to accommodate these variations in drive characteristics, prior systems control the electromechanical actuator according to a deceleration curve which assumes a worst case scenario. In other words, the deceleration schedule for decelerating the electromechanical actuator during a seek operation is based on the weakest magnets expected for production, the highest temperature expected during drive operation, and the lowest power supply voltage expected in any given drive. Controlling the drive according to this deceleration schedule amounts to assuming that only a certain level of current was available to the electromechanical actuator in order to decelerate the electromechanical actuator. In actuality, the current available to decelerate the electromechanical actuator is significantly greater than that which is assumed. Therefore, the deceleration (and hence the seek operation) has taken longer in prior drives than necessary.

SUMMARY OF THE INVENTION

An actuator in a disc drive is controlled to position a transducer over a target track on a disc surface. Movement of the actuator is initiated so the transducer begins moving toward the target track. The actuator is decelerated, as the transducer approaches the target track, according to a deceleration curve which is varied based on drive characteristics.

BRIEF DESCRIPTION OF THE DRAWINGS

FIG. 1 is a block diagram of a portion of a disc drive according to the present invention.

FIG. 2 is a schematic diagram illustrating a voice coil motor.

FIG. 3 is a graph in which current is plotted against time for a seek operation.

FIG. 4 illustrates a plot of a deceleration current assumed according to one preferred embodiment of the present invention.

FIG. 5 illustrates a deceleration curve in accordance with the present invention.

DETAILED DESCRIPTION OF THE PREFERRED EMBODIMENTS

FIG. 1 is a block diagram of disc drive 10 according to the present invention. Disc drive 10 includes drive controller 12, servo control processor 14, power amplifier 16, actuator assembly 18, disc stack assembly 20, preamplifier 22, data and clock recovery circuit 24, and error detection circuit 26. Drive controller 12 is typically a microprocessor, or digital computer, and is coupled to a host system or another drive controller which controls a plurality of drives.

Disc stack assembly 20 includes spindle 28 which preferably supports a plurality of coaxially arranged discs 30. The discs 30 are mounted for rotation with spindle 28 about axis of rotation 29. Each of the discs 30 has a first surface 32 and a second surface 34. Surfaces 32 and 34 both include concentric tracks for receiving and storing data in the form of flux reversals encoded on the tracks.

Actuator assembly 18 includes an actuator 36 supporting a plurality of actuator arms 38. Each of the actuator arms 38 is rigidly coupled to at least one head assembly 40. Each head assembly 40 includes a load beam, or a flexure arm, rigidly coupled to actuator arm 38 at a first end thereof, and to a suspension or gimbal at a second end thereof. The suspension is, in turn, coupled to a hydrodynamic air bearing which supports a data head (a read transducer and a write transducer) above the corresponding disc surface, 32 or 34, for accessing data within the tracks on the disc surface.

Actuator 36 is rotatably mounted with respect to the discs 30. Actuator 36 typically includes a voice coil which interacts with a magnet to produce the selective rotation of actuator 36. As actuator 36 rotates, it moves the transducers coupled to the head assemblies 40 either radially inward on disc 30, or radially outward on disc 30. In this way, actuator 36 performs a seek operation to position the transducers on head assemblies 40 over a desired track on the discs 30.

In operation, drive controller 12 typically receives a command signal from a host system which indicates that a certain portion of a disc 30 on disc stack assembly 20 is to be accessed. In response to the command signal, drive controller 12 provides servo control processor 14 with a position signal which indicates a particular cylinder over which actuator 36 is to position the head assemblies 40. Servo control processor 14 converts the position signal into an analog signal which is amplified by power amplifier 16 and is provided to actuator assembly 18. The analog signal first accelerates actuator assembly 18 toward a target track and then decelerates and stops actuator assembly 18 when head assemblies 40 are over the target tracks (or the target cylinder). In response to the analog position signal, actuator assembly 18 positions head assemblies 40 over a desired cylinder.

In a sector servo positioning drive, a portion of each sector has position information which is read by the data head and provided, through the read channel, to servo control processor 14. The positioning information gives tuning feedback to the servo control processor for better positioning.

It should be noted that the present system could also be used in a dedicated servo system in which one of the surfaces, 32 or 34, of a disc 30 is dedicated to servo information. This information is used to position head assemblies 40 over a desired cylinder.

In either type of system, servo control processor 14 reacts to the position information read from the disc stack assembly 20 and positions the head assemblies 40 accordingly.

Head assembly 40 generates a read signal containing data from a selected portion of the disc to be read. The read signal is provided to a preamplifier 22 which amplifies the read signal and provides it to a data and clock recovery circuit 24. Data and clock recovery circuit 24 recovers data, which is encoded on the disc surface when the data is written to the disc surface. The data is recovered from the read signal provided by preamplifier 22. Data and clock recovery circuit 24 operates in a known manner.

Once the data is recovered, it is provided to error detection circuit 26, which in one preferred embodiment, is based on an error correction code (ECC) such as a Reed-Solomon code. Error detection circuit 26 detects whether any errors have occurred in the data read back from the disc. Correctable errors are corrected by error detection circuit 26 or drive controller 12, or a combination of both, in a known manner.

FIG. 2 is a schematic diagram illustrating a model of a voice coil motor 42 which embodies electromechanical actuator 18. For the sake of the present invention, it can be assumed that, during deceleration of voice coil motor 42, motor, 42 is controlled in the voltage mode and that the full power supply voltage from a power supply used to control voice coil motor 42 is used to decelerate the motor. Thus, the current available to decelerate the actuator is:

$$I_{act}=(V_{ss}-V_{bemf})/R_{coil} \quad \text{Equation 1}$$

$$=I_s-I_{bemf} \quad \text{Equation 2}$$

Where $V_{ss}$ is equal to the power supply voltage output by the power supply in the disc drive;

$V_{bemf}$ is equal to the voltage by which the power supply is reduced based on the back electromotive force of the voice coil motor;

$R_{coil}$ is the resistance of the coil in the voice coil motor;

$I_s$ is the power supply voltage $V_{ss}$ divided by the coil resistance $R_{coil}$; and $I_{bemf}$ equals $V_{bemf}$ divided by the coil resistance $R_{coil}$.

$I_s$ can also be referred to as the stall current which is the current chat would flow in the voice coil motor 42 if the motor were held fixed and the full power supply voltage were applied to the coil. The back EMF of the voice coil motor is a linear function of the actuator velocity. Therefore, the actuator current can also be expressed as follows:

$$I_{act}=I^s-K_e V \quad \text{Equation 3}$$

Where $K_e$ is a constant representative of the back EMF of the motor expressed in terms of actuator current and v is the actuator velocity. Though the back EMF constant $K_e$ is usually expressed in terms of the back EMF voltage, the constant is expressed in terms of current for the sake of simplicity in the present derivation.

Next it is assumed that the acceleration constant of the actuator is $K_a$ so that the actuator acceleration is expressed as follows:

$$a=K_a I_{act} \quad \text{Equation 4}$$

Assuming that the full power supply voltage is used to decelerate voice coil motor 42, then the parametric relationship between the position (the distance from the transducer to the target track or the position to go) and velocity of the actuator can be illustrated as follows:

$$\frac{p}{K_p} = -\frac{v}{K_v} - \ln\left(1 - \frac{v}{K_v}\right) \quad \text{Equation 5}$$

$$\text{where } K_p = \frac{I_s}{K_a K_e^2}; \quad \text{Equation 6}$$

$$K_v = \frac{I_s}{K_e} \quad \text{Equation 7}$$

where p equals position in distance to the target; and
v equals velocity.

Now, defining the normalized position and velocity variables as follows:

$$\bar{p} = \frac{p}{K_p}; \quad \text{Equation 8}$$

$$\bar{v} = \frac{v}{K_v} \quad \text{Equation 9}$$

equation 5 can be rewritten to describe a normalized deceleration curve as follows:

$$\bar{p}=-\bar{v}-\ln(1-\bar{v}) \quad \text{Equation 10}$$

Implementing a control system which controls voice coil motor 42 according to the deceleration curve set out in Equation 10 provides significant advantages over prior control systems.

For example, FIG. 3 illustrates the actuator current applied to voice coil motor 42 during a typical seek operation. At time period $t_0$, servo control processor 14 causes the full voltage of the actuator power supply to be applied to actuator 18 (or voice coil motor 42). This results in the current flowing through voice coil motor, 42 at $t_0$ indicated by rising line 44 in FIG. 3. As the actuator embodied as voice coil motor 42 gains velocity, the current applied falls off by an amount equal to $I_{bemf}$ due to the back EMF characteristics of the voice coil motor.

At time $t_1$ (as the transducer approaches the target track), servo control processor 14 begins the deceleration process by applying the full voltage of the actuator power supply, in an opposite polarity, to voice coil motor 42. Thus, current begins to flow in the opposite direction through voice coil motor 42. This is indicated by line 46 in FIG. 3. Again, the applied current drops by an amount $I_{bemf}$ during deceleration of voice coil motor 42 during the time period $t_1$ to $t_2$. At time $t_2$, servo control processor 14 causes the voltage from the actuator power supply to be removed from the actuator. Thus, the current flowing through voice coil motor 42 drops to zero at time $t_2$.

FIG. 4 illustrates just the deceleration current from time $t_1$ to time $t_2$. FIG. 5 is a graph of position plotted against velocity for a pair of deceleration curves. In prior systems, deceleration of voice coil motor 42 is controlled according to a deceleration curve which assumes that the current available from the power supply to decelerate the voice coil motor is a constant current, and also assumes a worst case scenario. In other words, deceleration of voice coil motor 42 is controlled by servo control processor 14 assuming that the output voltage of the actuator power supply is at the lowest expected voltage, the temperature of the drive is at the highest expected temperature, and the magnets used in the actuator are the weakest expected magnets, Thus, prior systems would assume that the current available to decelerate the actuator is that illustrated by dashed line 48 in FIG. 4. By assuming a constant deceleration current, the resulting deceleration curve in prior systems is a square root deceleration curve generally indicated by line 48' in FIG. 5. The deceleration curve 48' is roughly described by:

$$p = \sqrt{K_{vv}}$$ Equation 11

Since the assumed available current is so far below the actual available current, arid since the current available is assumed to be constant, the deceleration portion of a seek operation in conventional systems takes far longer than it should. Thus, the deceleration portion of a seek operation is inefficient.

The worst case margin associated with prior systems typically runs on the order of 15 to 20 percent of the theoretical maximum current available. The danger with assuming an available deceleration current closer to the theoretical maximum deceleration current is that if too high a current is assumed during the deceleration portion of the seek operation, the actuator will overshoot the target track. The time associated with correcting for an overshoot is much greater than the extra time taken in assuming too low a current However, the 15 to 20 percent conventional margin is highly inefficient, nonetheless.

The present invention assumes an available deceleration current which is much closer to the actual current available. Also, the present invention controls the deceleration according to a deceleration curve which can be quickly and easily adapted on a drive-by-drive basis, or during the lifetime and operation of the drive, or both.

The deceleration curve set out in Equation 10 is preferably implemented by a lookup table or another suitable method, so that for any given normalized position, the corresponding normalized velocity is obtained.

FIG. 4 shows, by dashed line 50, a deceleration current which is assumed in accordance with the present invention. It can be seen that deceleration current 50 is much closer to the theoretical maximum deceleration current represented by line 52, than the worst case scenario of prior systems indicated by dashed line 48.

FIG. 5 shows that the deceleration curve which results from assuming deceleration current 50 is a logarithmic curve 50'. It can be seen that, in controlling according to curve 50', as opposed to curve 48', a seek operation can be performed much more quickly. Also, in order to adapt to changing drive conditions, or to adapt for different families of drives, thee assumed current represented by dashed line 50 in FIG. 4 is simply moved upwardly or downwardly in the direction indicated by arrow 54. This is done as discussed in greater detail below by simply changing the sealing constants $K_p^{-1}$ and $K_v$, which are used in Equation 10. This results in a similar shift in the corresponding deceleration curve shown in FIG. 5.

During deceleration, the measured position to go to the desired track is normalized by the scale $K_p^{-1}$. The normalized deceleration curve is used to determine the desired normalized velocity which is then denormalized by the scale $K_v$ to produce the desired deceleration velocity. Once the denormalized desired velocity is obtained, the current needed to achieve that velocity can be obtained.

The deceleration curve for any voice coil motor based actuator can thus be accommodated by simply changing the scaling parameters, $K_p^{-1}$ and $K_v$.

In other words, Equation 10 is solved once iteratively (preferably when the code is written) and then, simply by changing the variables $K_p$ and $K_v$, the deceleration curve can be changed (moved upwardly or downwardly) from one seek operation to the next, or on a drive-by-drive basis. This can be done to adapt the curve to accommodate different families of disc drives of potentially different sizes, production variation among individual drives of the same family, and variations in a single drive during its life and operation.

One preferred aspect of the present invention is that the deceleration curve is changeable such that drive performance can be optimized in real time to varying conditions such as power supply voltage and drive temperature. If the three actuator parameters ($I_s$, $K_e$ and $K_a$) are continually or periodically estimated during drive operation, then updated deceleration scaling parameters ($K_p^{-1}$ and $K_v$) can be calculated. Drive performance can then be continually re-optimized throughout the life of the drive.

According to another preferred feature of the present invention, the margin used in implementing the deceleration curve can be varied depending on the location of the target track on the disc surface. For instance if one of the drive parameters (such as temperature, or voltage supply, changes immediately, a control system implementing the present invention could overshoot a target track. If the target track is near the edge of the disc surface (either near the radial inner track, or the radial outer track) the actuator may cause the data head to physically run off of the edge of the disc or hit a physical barrier (such as a positive stop) at high velocity. This can cause damage to the data head or actuator, or it can cause a significant time delay.

Therefore, a system implementing the present invention preferably includes an extra percent margin for seeks which are conducted near the edges of the disc. The present invention preferably performs a slower, more cautious seek at the edges of the disc, and has a very low percent margin for other seeks. In one preferred embodiment, the percent margin implemented for seeks in the middle portion of the disc (e.g., where the target track is in excess of approximately 100 tracks from either radial edge of the disc surface) is approximately 5 percent of the theoretical maximum current or less. This is compared to a worst case margin implemented in prior drives which was approximately 15 percent to 20 percent. However, in the present invention, where seeks are performed near the edges of the disc, the percent margin is preferably increased to 20 percent or less, and even more preferably to 10 percent, or less. This substantially reduces the likelihood of an overshoot near the edges of the disc.

The voice coil motor is typically powered by a 12 volt power supply which is specified as having a tolerance of +/−10 percent. The present invention has actually been tested in drives in which the 12 volt supply was increased and decreased by 10 percent, and in which the magnets were changed too provide higher and lower strength magnets. Using the present invention, the performance criteria (gain margin, phase margin and band width) remained substantially the same even given these variations.

It should be noted that conventional wisdom indicates that varying the logarithmic curve represented by line 50' would be very difficult in order to accommodate for changing drive conditions. This was thought to be true because equation 10 is a more difficult function than the square root curve, and the inverse has no closed form solution. However, in accordance with the present invention, Equation 10 is simply solved once iteratively and then the curve scales very easily using the scaling terms $K_v$ and $K_p^{-1}$. This allows the curve to be quickly adapted to changing drive conditions.

Thus, the present invention provides a number of advantages over prior control systems used in controlling disc drive actuators. The present invention provides a single normalized deceleration curve which can be used for substantially any voice coil motor-driven actuator. In addition, the present invention uses scaling constants which are adapted to adjust the normalized deceleration curve to fit different conditions. Further, the present invention provides an adaptive deceleration curve which can be changed by simply changing the scaling constants $K_p^{-1}$ and $K_v$ to re-optimize drive performance due to changing drive conditions during the life and operation of the drive.

Although the present invention has been described with reference to preferred embodiments, workers skilled in the art will recognize that changes may be made in form and detail without departing from the spirit and scope of the invention.

What is claimed is:

1. A method of positioning a transducer over a desired track on a surface of a disc in a disc drive, the disc drive operating based on drive parameters, the transducer being movable relative to the disc drive with a servo motor, the method comprising:

(a) applying an acceleration signal to the servo motor to begin radial positioning of the transducer relative to the disc surface;

(b) applying a deceleration signal to the servo motor to stop radial positioning of the transducer relative to the disc surface;

(c) controlling application of the deceleration signal to the servo motor according to a deceleration curve the deceleration curve being set as a percentage of an estimate of an actual deceleration current; and (d) varying the percentage of the estimate of the actual deceleration current used to set the deceleration curve based on at least one drive parameter and based on a location of the desired track relative to inner and outer radial edges of the disc surface.

2. The method of claim 1 wherein the deceleration curve comprises a generally logarithmic curve.

3. The method of claim 1 wherein varying the deceleration curve comprises:

dynamically varying the deceleration curve during operation of the disc drive.

4. The method of claim 1 wherein varying the deceleration curve comprises varying the deceleration curve based on drive type.

5. The method of claims 1 wherein varying the deceleration curve comprises varying the deceleration curve on a drive-by-drive basis.

6. The method of claim 1 wherein varying the deceleration curve comprises:

varying the deceleration curve based on an age of the disc drive.

7. The method of claim 1 wherein the servo motor includes magnets and wherein varying the deceleration curve comprises:

varying the deceleration curve based on a strength of the magnets.

8. The method of claim 1 wherein varying the deceleration curve comprises:

varying the deceleration curved based on drive temperature.

9. The method of claim 1 wherein the servo motor includes a power supply having a power supply output and wherein varying the deceleration curve comprises:

varying the deceleration curve based on the power supply output.

10. The method of claim 1 wherein setting the deceleration curve based on a percent of the estimated current comprises:

setting the deceleration curve based on a first percent of the estimated current when the target track is within a first range of a radial edges of the disc; and setting the deceleration current based on a second percent of the estimated current when the target track is within a second range of a radial edges of the disc.

11. The method of claim 1 wherein the deceleration curve is generally of the form $$\bar{p} = -\bar{v} - \ln(1-\bar{v})$$

where $\bar{p}$ equals $p/K_p$, and $\bar{v}$ equals $v/K_v$, p being indicative of a distance between the transducer and the desired track, and v being indicative of velocity of the transducer over the disc surface, and where $K_p$ is a position scaling factor for the disc drive and $K_v$ is a velocity scaling factor for the disc drive.

12. The method of claim 11 wherein varying the deceleration curve comprises:

periodically re-determining values of at least one of $I_s$, $K_v$ and $K_p$ where $I_s$ is an estimation of current available from the power supply, and varying the deceleration curve based on the re-determined values.

13. The method of claim 1 wherein varying step (d) comprises:

(d) (1) reducing the percentage to a first level when the desired track is within a first range of one of the inner and outer radial edges; and (d) (2) increasing the percentage to a second level greater than the first level, when the target tack is further from the one of the inner and outer radial edges than the first range.

14. A method of controlling a voice coil based actuator to position a transducer over a target track on a disc surface in a disc drive, the method comprising:

(a) beginning movement of the actuator so the transducer moves toward the target track;

(b) decelerating the actuator, as the transducer approaches the target site, according to a deceleration curve which is generally logarithmic and set according to a predetermined relationship relative to an estimate of an actual deceleration current; and (c) varying the predetermined relationship based on a position of the target track relative to inner and outer radial edges of the disc surface.

15. The method of claim 14 and further comprising:

varying the deceleration curve to accommodate for differences in values of drive characteristics from expected values for the drive characteristics.

16. The method of claim 15 wherein the drive characteristics comprise at least one of an age of the disc drive, output of a power supply powering the actuator, drive temperature, and a strength of magnets used in the actuator.

17. The method of claim 15 wherein the deceleration curve is generally of the form $$\bar{p} = -\bar{v} - \ln(1-\bar{v})$$

where $\bar{p}$ equals $p/K_p$, and $\bar{v}$ equals $v/K_v$, p being indicative of a distance between the transducer and the desired track, and v being indicative of velocity of the transducer over the disc surface, and where $K_p$ is a position scaling factor for the disc drive and $K_v$ is a velocity scaling factor for the disc drive; and wherein varying the deceleration curve comprises periodically re-determining values of at least one of $I_s$, $K_v$ and $K_p$ where $I_s$ is an estimation of current available from the power supply, and varying the deceleration curve based on the re-determined values.

18. The method of claim 14 and further comprising:

varying the deceleration curve based on periodic estimates of a parameter indicative of a deceleration current used to decelerate the actuator.

19. The method of claim 14 wherein the predetermined relationship comprises a percent of the estimate and wherein varying step (c) comprises:

(c) (1) increasing the percent when the target track is within a predetermined distance of one of the inner and outer radial edges; and (c) (2) decreasing the percent when the target track is outside the predetermined distance.

20. A method of controlling a voice coil based actuator to position a transducer over a target track on a disc surface in a disc drive, the method comprising:

(a) beginning movement of the actuator so the transducer moves toward the target track;

(b) decelerating the actuator, as the transducer approaches the target site, according to a deceleration curve which is generally logarithmic and set according to a predetermined relationship relative to an actual deceleration current; and (c) varying the predetermined relationship based on a position of the target track relative to inner and outer radial edges of the disc surface and varying the deceleration curve to accommodate for differences in values of drive characteristics from expected values for the drive characteristics, wherein the drive characteristics comprise at least one of an age of the disc drive, output of a power supply powering the actuator, drive temperature, and a strength of magnets used in the actuator; wherein the deceleration curve is generally of the form $$\bar{p} = -\bar{v} - \ln(1-\bar{v})$$

where $\bar{p}$ equals $p/K_p$, and $\bar{v}$ equals $v/K_v$, p being indicative of a distance between the transducer and the desired track, and v being indicative of velocity of the transducer over the disc surface, and where $K_p$ is a position scaling factor for the disc drive and $K_v$ is a velocity scaling factor for the disc drive; and wherein varying the deceleration curve comprises periodically re-determining values of at least one of $I_s$, $K_v$ and $K_p$ where $I_s$ is an estimation of current available from the power supply, and varying the deceleration curve based on the re-determined values.

* * * * *